Sept. 16, 1958 J. R. WILKERSON 2,852,674

PULSE SHAPING AMPLIFIER

Filed June 18, 1956

INVENTOR.
Jefferson R. Wilkerson

BY [signature]
H. H. [signature]
Attorneys

United States Patent Office 2,852,674

Patented Sept. 16, 1958

2,852,674

PULSE SHAPING AMPLIFIER

Jefferson R. Wilkerson, Westbury, N. Y., assignor, by mesne assignments, to the United States of America as represented by the Secretary of the Navy Application June 18, 1956, Serial No. 592,224

3 Claims. (Cl. 250—27)

The present invention relates to novel and improved electronic pulse shaping apparatus and more particularly to a novel and improved pulse shaping circuit for converting a pulse of irregular shape into a pulse of rectangular shape.

It is a principal object of the present invention to provide novel and improved pulse shaping apparatus which after passage of a pulse therethrough returns to its quiescent operating condition substantially instantly.

It is further object of the present invention to provide novel and improved pulse shaping apparatus having a component amplifier which operates at high gain independently of the pulse duration, its recurrence rate, and its duty cycle over a wide range of variation thereof.

Figures 2A, 2B, 2C:
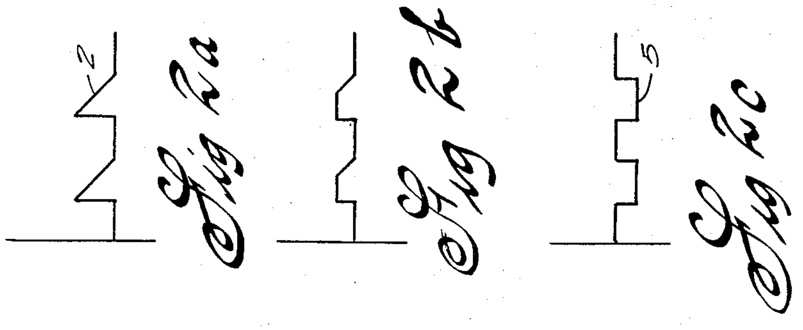
Figure 1:
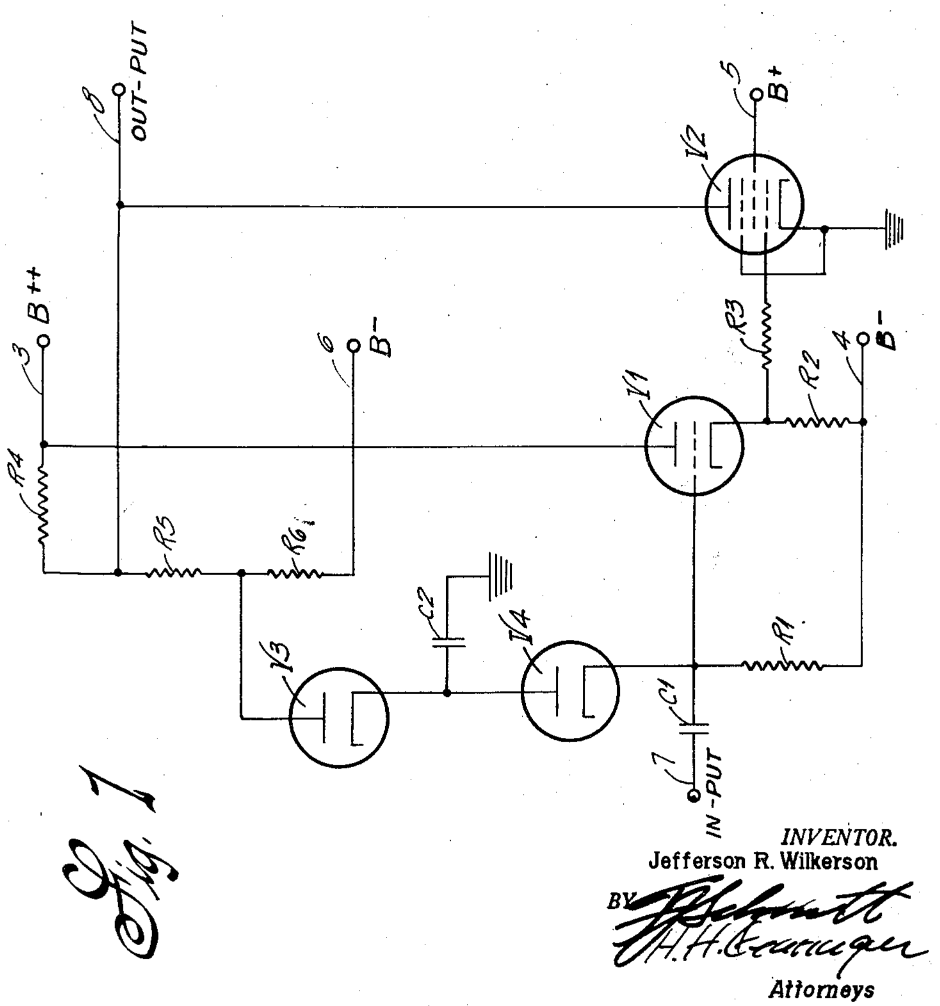

Other objects and many of the attendant advantages of this invention will be readily appreciated as the same becomes better understood by reference to the following detailed description when considered in connection with the accompanying drawing wherein:

Figure 1 is a schematic electrical diagram of a preferred embodiment of the present invention; and Figures 2*a*, 2*b*, and 2*c* are waveforms of the circuit shown in Figure 1 at selected points therein.

A preferred embodiment of the present invention is illustrated in Figure 1 of the drawing. As shown therein, the positive generally triangularly-shaped pulse 2 of Figure 2*a* of the drawing is fed into the grid circuit of tube V–1 through condenser C–1 and resistor R–1. For reasons which will be more apparent hereinafter values of the capacitor C–1 and resistor R–1 in the input circuit are preferably relatively large so that the circuit has a long time constant compared to the duration and repetition rate of pulses within a given duty cycle. The plate circuit of tube V–1 which acts as a cathode follower and thereby provides a relatively low driving impedance for subsequent circuitry extends from the positive 300 volt supply line 3 through the tube and resistor R–2 to the negative 150 volt supply line 4. The cathode of tube V–1 is preferably directly coupled to control grid of tube V–2 through resistor R–3. The plate circuit of tube V–2 extends from the positive 300 volt supply line 3 through resistor R–4 and the tube to ground. The suppressor and screen grids of tube V–2 are preferably respectively coupled to ground and the positive 75 volt supply line 5.

The plate of tube V–2, from which point the desired output rectangular pulse 5 is obtained, is preferably connected through resistors R–5 and R–6 to the negative 150 volt supply line 6. The junction of resistors R–5 and R–6 is in turn coupled to the control grid of tube V–1 through diode V–3 and diode V–4 and the junction of diodes V–3 and V–4 is preferably coupled to ground through condenser C–2.

By way of example only preferred values of the parameters of the above described circuit are as follows:

| | |
|---|---|
| $R_1$=10 Meg. | $R_5$=240K |
| $R_2$=75K | $R_6$=150K |
| $R_3$=30K | $C_1$=1$\mu$f. |
| $R_4$=30K | $C_2$=.5$\mu$f. |

In operation the positive irregular shaped pulse 2, which as shown in Figure 2*a* of the drawing takes the form of a generally triangular pulse herein, is applied at the circuit input terminal 7 thereby instantaneously raising the grid potential of tube V–1. This increases the cathode potential of cathode follower V–1 and the potential of control grid of pentode V–2. As the control grid of V–2 is driven positive, the flow of grid current through resistor R–3 produces a flattening of the positive pulse thereat as shown in Figure 2*b* of the drawing and at the same time limits the depth to which the plate voltage of pentode V–2 and the output pulse at 8 can fall. In this way the desired generally rectangular output pulse is obtained.

A particularly unique feature of the above described circuitry is performed by the diodes V–3 and V–4 and their associated circuits. More specifically, during a quiescent period, that is between periodic duty cycles of the input generally triangular pulse 2, the operating condition of pentode V–2 is maintained at a level at which its gain is high. This is obtained by proper selection and control of the various resistances, capacitances, and supply voltage sources of the circuit. Upon arrival of the positive pulse 2 at the grid of triode V–1 the cathode of diode V–4 is driven in the positive direction to a voltage above that of its plate which is maintained substantially at its quiescent value by the capacitor C–2 between diodes V–3 and V–4. After the pulse has passed, the cathode of diode V–4 tends to return to its quiescent value. If it overshoots and falls to a lower voltage than its normal quiescent potential which it may since it is connected through resistor R–1 to the negative 150 volt supply line 4, current from the capacitor C–2 will flow through diode V–4 and resistor R–1 to increase the grid potential of triode V–1 and thereby tend to return circuit voltages to those values for which the amplifier tube V–2 has high gain.

Substantially simultaneous with the arrival of the positive pulse at the control grid of triode V–1 and the consequent drop of potential at the plate of the pentode V–2, the potential of the plate voltage of diode V–3 is also momentarily decreased. Inasmuch as the capacitor C–2 between the diodes V–3 and V–4 maintains the voltage of the cathode of diode V–3, the plate voltage of diode V–3 is driven below its cathode voltage. Thus, both diodes V–3 and V–4 are cut off in the presence of the positive pulse 2. After the pulse has passed, the plate of the pentode V–2 tends to return to its normal quiescent value. If, however, it overshoots and rises to a higher potential which it may because it is connected to the positive 300 volt supply line 3, the current through diodes V–3 and V–4 and resistor R–1 will increase the grid potential of triode V–1 and pentode V–2 and an increase of current through resistor R–4 will quickly tend to reestablish the normal quiescent value of plate voltage for pentode V–2 at which the amplifier exhibits high gain.

In the absence of a pulse at terminal 7 of the subject wave-shaping circuit the diodes V–3 and V–4, the capacitor C–2 and their various associated resistive elements maintain the plate current of pentode V–2 substantially constant thereby assuming optimum conditions for operation at high gain. Moreover, the diodes V–3 and V–4, capacitor V–2 and their associated resistors stabilize operation of the circuit for optimum operation even when the component tubes thereof deteriorate slightly or other circuit parameters change their operating characteristics. Thus, for example, if the potential at the plate of diode V–3 increases, increased current through the diodes V–3 and V–4 increases the charge across capacitor C–2 and the grid potential of triode V–1 to similarly increase the control grid potential of pentode V–2, increase the plate current therethrough and ultimately tend to decrease and compensate for the initial change in the potential at the plate of pentode V–2 and diode V–3.

Obviously many modifications and variations of the present invention are possible in the light of the above teachings. It is therefore to be understood that within the scope of the appended claims the invention may be practiced otherwise than as specifically described.

What is claimed is:

1. Pulse shaping apparatus comprising a circuit into which a positive irregular pulse may be applied; a cathode follower circuit coupled to the output of said circuit; a pentode amplifier coupled to the output of the cathode follower circuit; and amplifier stabilizing means including a pair of series connected diode elements and a capacitor element coupled between the junction of the diode elements and ground for coupling the plate circuit of the pentode amplifier to the grid of the cathode follower.

2. Pulse shaping apparatus comprising a circuit into which a positive irregular pulse may be applied; a cathode follower circuit coupled to the output of said circuit; a pentode amplifier coupled to the output of the cathode follower circuit; means for limiting the maximum positive value of the input potential of the amplifier and amplifier stabilizing means including a pair of series connected diode elements and a capacitor element coupled between the junction of the diode elements and ground for coupling the plate circuit of the pentode amplifier to the grid of the cathode follower.

3. Pulse shaping apparatus comprising a circuit into which a positive irregular pulse may be applied; a cathode follower circuit coupled to the output of said circuit; a pentode amplifier coupled to the output of the cathode follower circuit; means including a resistive element in the grid circuit of the amplifier for limiting the maximum positive value of the input potential of the amplifier; and amplifier stabilizing means including a pair of series connected diode elements and a capacitor element coupled between the junction of the diode elements and ground for coupling the plate circuit of the pentode amplifier to the grid of the cathode follower.

References Cited in the file of this patent

UNITED STATES PATENTS

| | | |
|---|---|---|
| 2,509,742 | Mynall | May 30, 1950 |
| 2,653,235 | Cock et al. | Sept. 22, 1953 |